United States Patent
Frampton

(10) Patent No.: US 10,447,077 B2
(45) Date of Patent: Oct. 15, 2019

(54) PREDICTIVE GENERATOR EVENTS

(71) Applicant: Kohler Co., Kohler, WI (US)

(72) Inventor: Isaac S. Frampton, Strattanville, PA (US)

(73) Assignee: Kohler Co., Kohler, WI (US)

( * ) Notice: Subject to any disclaimer, the term of this patent is extended or adjusted under 35 U.S.C. 154(b) by 94 days.

(21) Appl. No.: 15/497,863

(22) Filed: Apr. 26, 2017

(65) Prior Publication Data

US 2018/0316220 A1 Nov. 1, 2018

(51) Int. Cl.

| | |
|---|---|
| *G05B 13/02* | (2006.01) |
| *H02J 13/00* | (2006.01) |
| *H02J 3/46* | (2006.01) |
| *G06N 20/00* | (2019.01) |
| *H02K 99/00* | (2014.01) |
| *H02J 3/00* | (2006.01) |

(52) U.S. Cl.
CPC ........ *H02J 13/0062* (2013.01); *G05B 13/026* (2013.01); *G06N 20/00* (2019.01); *H02J 3/46* (2013.01); *H02K 99/10* (2016.11); *H02J 2003/003* (2013.01); *Y02E 60/7838* (2013.01); *Y04S 40/124* (2013.01)

(58) Field of Classification Search
CPC ...... H02J 13/0062; H02J 3/46; G05B 13/026; G06N 99/005
See application file for complete search history.

(56) References Cited

U.S. PATENT DOCUMENTS

| | | | |
|---|---|---|---|
| 6,583,521 B1 | 6/2003 | Lagod et al. | |
| 7,155,912 B2 | 1/2007 | Enis et al. | |
| 7,305,282 B2 | 12/2007 | Chen | |
| 9,597,975 B2 | 3/2017 | Ito et al. | |
| 2005/0154499 A1* | 7/2005 | Aldridge | ................ F02G 1/043 700/286 |

(Continued)

FOREIGN PATENT DOCUMENTS

| | | |
|---|---|---|
| EP | 2916415 A1 | 9/2015 |
| EP | 2980734 A1 | 2/2016 |

(Continued)

OTHER PUBLICATIONS

European Search Report for corresponding Application No. 181557927-1202, dated Aug. 9, 2018.

(Continued)

*Primary Examiner* — Christopher E. Everett
(74) *Attorney, Agent, or Firm* — Lempia Summerfield Katz LLC

(57) ABSTRACT

An apparatus for predicting a load event in a generator system or a method for predicting the load event in the generator system may include monitoring output data associated with an electrical output of a generator, monitoring external sensor data associated with the generator, detecting a load event for the generator from the output data, identifying a subset of the external sensor data that preceded the load event from the output data, performing an analysis of the subset of the external sensor data, and determining a load event characteristic from the analysis, the load event characteristic indicative of a subsequent load event for the generator.

19 Claims, 10 Drawing Sheets

(56) References Cited

U.S. PATENT DOCUMENTS

| | | | |
|---|---|---|---|
| 2005/0246039 A1* | 11/2005 | Iino | G05B 13/042 700/29 |
| 2008/0189567 A1 | 8/2008 | Goodnow et al. | |
| 2010/0023174 A1* | 1/2010 | Nagata | H02J 3/32 700/287 |
| 2010/0082172 A1* | 4/2010 | Ko | G06Q 30/02 700/291 |
| 2010/0102637 A1* | 4/2010 | Dozier | H02J 3/46 307/84 |
| 2010/0106389 A1* | 4/2010 | Fore | F02D 29/06 701/102 |
| 2010/0179704 A1* | 7/2010 | Ozog | G06Q 10/06315 700/291 |
| 2013/0024035 A1 | 1/2013 | Ito et al. | |
| 2013/0096726 A1* | 4/2013 | Lyren | H02J 3/14 700/291 |
| 2014/0058572 A1* | 2/2014 | Stein | G06Q 50/06 700/291 |
| 2014/0200723 A1* | 7/2014 | Roy | G06Q 50/06 700/291 |
| 2014/0210256 A1* | 7/2014 | Raats | H02J 9/00 307/9.1 |
| 2014/0244058 A1* | 8/2014 | Zweigle | H02J 13/001 700/291 |
| 2014/0277817 A1* | 9/2014 | Stevens | G05D 23/1917 700/300 |
| 2014/0336960 A1* | 11/2014 | Haghighat-Kashani | G06Q 10/04 702/60 |
| 2015/0006440 A1 | 1/2015 | Nicholson et al. | |
| 2015/0051746 A1* | 2/2015 | Mathiesen | H02J 3/14 700/291 |
| 2015/0120247 A1* | 4/2015 | Albsmeier | G01M 15/046 702/183 |
| 2015/0234410 A1* | 8/2015 | Aganagic | G05F 1/66 700/291 |
| 2016/0028234 A1 | 1/2016 | Watanabe et al. | |
| 2016/0042377 A1 | 2/2016 | Ilic et al. | |
| 2016/0049891 A1* | 2/2016 | Frampton | H02P 9/006 322/25 |
| 2016/0077538 A1* | 3/2016 | Berka | G06Q 50/06 700/291 |
| 2016/0124451 A1* | 5/2016 | Yoshitani | H02J 13/0006 700/291 |
| 2016/0154453 A1 | 6/2016 | Sasaki et al. | |
| 2016/0266181 A1 | 9/2016 | Kawaguchi et al. | |
| 2016/0282231 A1 | 9/2016 | Keene et al. | |
| 2017/0017215 A1 | 1/2017 | Shimizu | |
| 2018/0175626 A1* | 6/2018 | Gerdes | G05F 1/66 |

FOREIGN PATENT DOCUMENTS

| | | |
|---|---|---|
| EP | 3082096 A4 | 10/2016 |
| JP | 03289383 A | 12/1991 |
| RU | 109801 U1 | 10/2011 |
| WO | WO0171881 A3 | 2/2002 |
| WO | WO2005041326 A3 | 3/2006 |
| WO | WO2015019541 A1 | 2/2015 |
| WO | 2015028636 A1 | 3/2015 |

OTHER PUBLICATIONS

Panapakidis, Ioannis P., and Grigoris K. Papagiannis. "Enhancing the performance of Feed-Forward Neural Networks in the bus short-term load forecasting." Power Engineering Conference (UPEC), 2014 49th International Universities. IEEE, 2014.

Basu, K. "Predicting Home Service Demands From Appliance Usage Data." Grenoble Institute of Technology (Jun. 2011): 1-50.

Stavast, P. "Prediction of Energy Consumption Using Historical Data and Twitter," University of Groningen (Mar. 2014): 1-45.

* cited by examiner

PREDICTIVE GENERATOR EVENTS

FIELD

This disclosure relates in general to the field of power generators, and more specifically, a generator controller that is configured and/or reconfigured based on feedback from the output of the generator system.

BACKGROUND

An engine-generator set, which may be referred to as a generator or a genset, may include an engine and an alternator or another device for generating electrical energy or power. One or more generators may provide electrical power to a load through a power bus. A generator may be connected to the power bus through a switch (e.g., breaker). The power bus, which may be referred to as a generator bus or common bus, transfers the electrical power from the engine-generator set to a load.

Sometimes the load on the engine-generator set is difficult to predict. Some loads may have particularly high power requirements but be operated relatively rarely. When these loads are coupled to the engine-generator set at random times or times that are not readily predictable, the generator system must be configured to provide sufficient power at all times, even when the high load is not connected. For example, an extra engine-generator set may be running and coupled to the generator system. This unnecessarily consumes fuel and other resources.

BRIEF DESCRIPTION OF THE DRAWINGS

Exemplary embodiments are described herein with reference to the following drawings.

DETAILED DESCRIPTION

Figure 1:
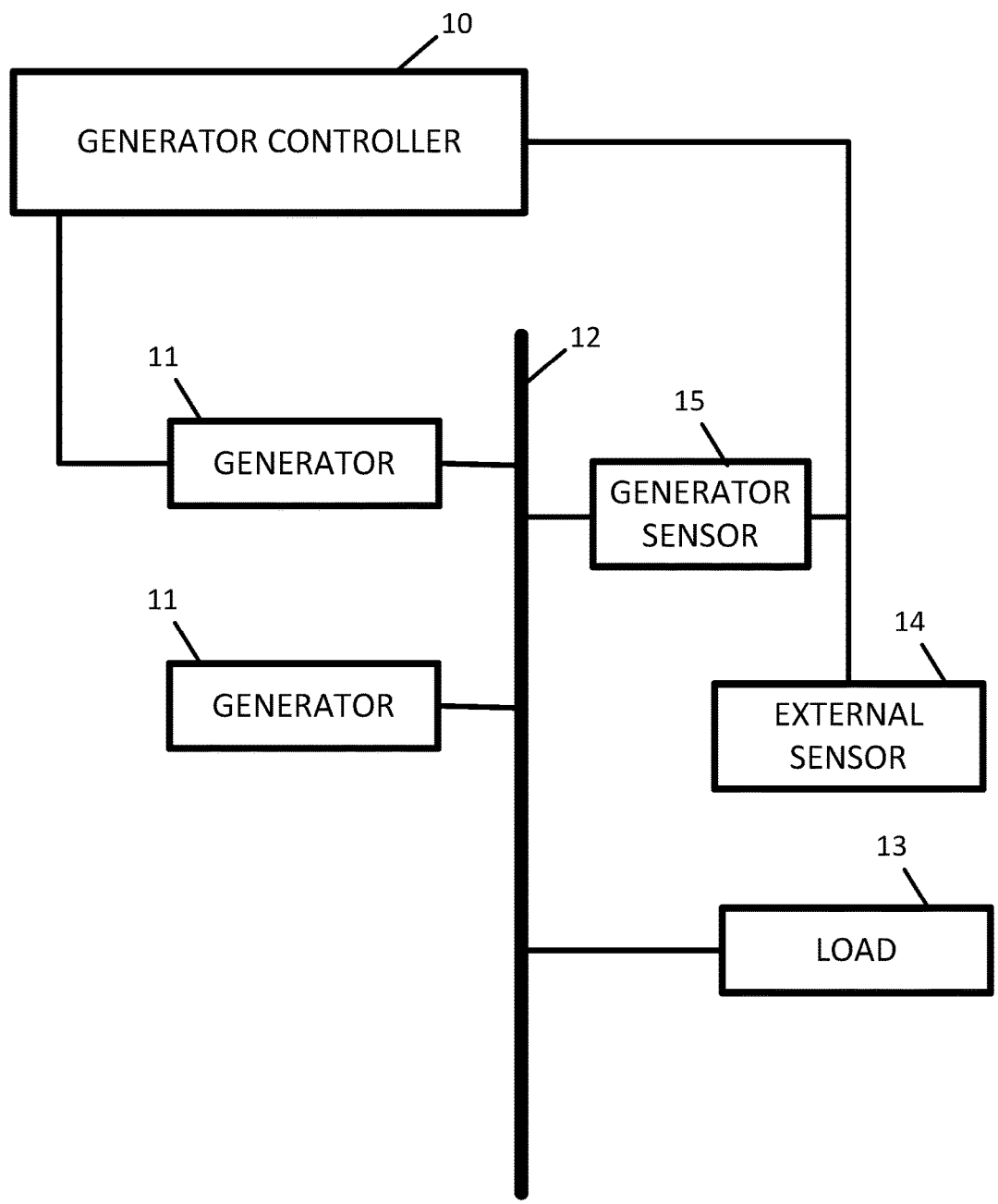
FIG. 1 illustrates an example generator system and generator controller.

A generator system provides electrical power to one or more loads. Loads may be added or removed from connection with the generator system. Power requirements of individual loads may change over time. To adjust to the changing power requirements, additional generators may be brought online, or taken offline, in order to meet the demands of the load. A generator cannot be brought online or taken offline instantly. Thus, when a generator is brought online in response to a spike in load, there may be a time period in which the load is not met by the generator system that occurs while the additional generator is brought online. The increased load itself cannot be detected before the load occurs, which means the command to bring the additional generator online cannot be sent before the load occurs. The following embodiments include techniques for identifying other load triggers that occur before the load is placed on the generator system. The other load triggers may be related to temperature, reactive power, wave shapes, distortion, power factor, time, weather, events, or other data external to the generator system. The generator system may detect the load trigger and modify the generator system configuration in response to the load trigger.

This algorithm potentially reduces the number of generators operating in the system by predicting the need to provide additional capacity before the need arises, providing power when needed. Without the ability to predict sudden changes in load, it is necessary to retain sufficient generation capacity to handle any possible load changes.

Although the factors that may predict a change in load may vary between sites, there is a need for a system that provides functionality for detecting the triggers provided and determining their usefulness. A useful trigger is one that provides a clear indication in sufficient time to allow additional capacity to become available. Useless triggers either occur too late (e.g. the increase in load itself), or are not readily detectable (e.g. energizing a 16 W LED bulb in a factor with 200 kW typical load). The invention described herein provides a means to detect triggers and to differentiate between useful triggers and useless triggers.

If no trigger exists for a load, the load is considered unpredictable. In order to ensure sufficient generation capacity is kept online to supply all loads and future increases in load, unpredictable loads will require that sufficient capacity be online to provide them at any time. In this case, the proposed invention will behave no differently than a system without prediction ability.

If any trigger is found for a load (based on any input to the system), a load is considered predictable. If the trigger occurs sufficiently before the load event to add new capacity to the generator system or to react in another way, the load is considered predictable and eligible, meaning that generation capacity is not necessary to be kept in reserve when the load is offline.

Figure 2:
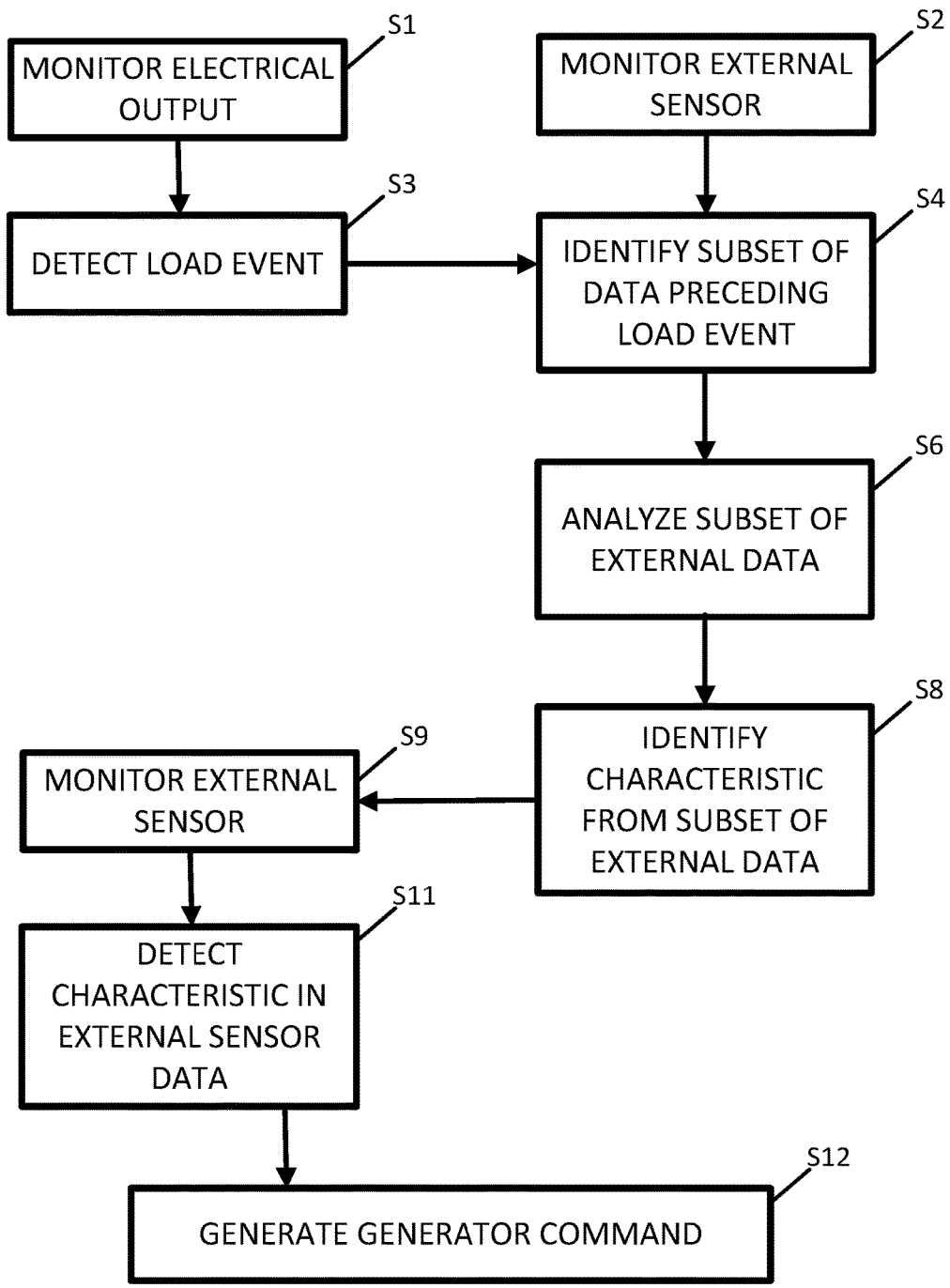
FIG. 2 illustrates a flow chart for prediction of generator events.

FIG. 1 illustrates an example generator system including a generator controller 10, multiple generators 11, a power bus 12, a generator sensor 15 and an external sensor 14. The generator system is also connected to a load 13. Additional, different, or fewer components may be included. The phrases "coupled with" or "coupled to" include directly connected to or indirectly connected through one or more intermediate components. Additional, different, or fewer components may be provided. Additional, different, or fewer components may be included. FIG. 2 illustrates a flow chart for prediction of generator events by the generator controller 10 or another device. Additional, different, or fewer acts may be included in the flow chart.

The generator controller 10 may control one of the multiple generators 11, and multiple generator controllers may be included. The generator controller 10 may control some or all of the multiple generators 11. The generator controller 10 may determine the output of the generator. In one example, the generator controller 10 controls an electrical characteristic of the output such as the voltage, current, or frequency of the output of the generator. The generator controller 10 may modify the voltage or current of the output of the generator by changing the field current that provides a magnetic field for inducing the output of the generator. The generator controller 10 may adjust the speed of the engine in the engine generator set by adjusting the throttle of the engine which modifies the frequency of the output of the generator.

The generator controller 10 may generate instructions to one or more switching devices for bringing generators in and out of electrical coupling with the power bus 12. The generator controller 10 may generate instructions to one or more switching devices for bringing loads in and out of electrical coupling with the power bus 12. The switching devices may include breakers, relays, contactors, vacuum fault interrupters, oil-immersed automated switches, automatic transfer switches, or electrically operated switches and may be used to selectively connect or disconnect elements or devices in the generator system.

As shown by act S1, the generator sensor 15 may collect data associated with an electrical output of the generator or the system of generators. The generator sensor 15 may detect one or more of the electrical parameters of the generator output. The generator sensor 15 may include a voltage sensor or voltage sensing circuit, a current sensor or current sensing circuit, or a frequency sensor of frequency sensing circuit.

As shown by act S2, the external sensor 14 collects data associated with the generator or the generator system. The external sensor 14 may collect one or more different types of data for the generator or the generator system. The data may be temperature data, power data, waveshape data, power factor data, or another type of data.

The temperature data may describe the ambient temperature in the vicinity of the generator system, and the external sensor 14 may be mounted on the exterior of a generator 11 or nearby. The temperature data may describe the interior an operating temperature within the generator system, and the external sensor 14 may be mounted on the interior of a generator 11. The temperature data may describe the ambient temperature in the vicinity of the load 13, and the external sensor 14 may be mounted on the load 13 or nearby (e.g., in the same room or facility as the load 13).

The power data may describe the reactive power provided to the load 13. For reactive power, the external sensor 14 may be a reactive power sensor. The reactive power sensor may be a standalone device including a power supply that measures the voltage and current provided to the load 13 with respect to time. The reactive power sensor may provide a data readout or signal (e.g., in VAR) to the generator controller 10. The reactive power provided to the load may also be determined by voltage and current measured directly by the generator controller 10.

The power data may also describe the real power provided to the load 13. For real power, the external sensor 14 may be a real power sensor. The real power sensor may be a standalone device including a power supply that measures the voltage and current provided to the load 13 with respect to time. The real power sensor may provide a data readout or signal (e.g. in W) to the generator controller 10. The real power provided to the load may also be determined by voltage and current measured directly by the generator controller 10.

The power data may include data indicative of whether a particular load 13 is on or off. In some examples, the power data may include components for multiple loads. The existence or power level of one component of the load may be used to predict the future activation of another component of the load.

As an example of component activation predicting future load activation, activation of a cooling pump may precede the starting of a larger piece of equipment. As another example of component activation predicting future load activation, activation of lighting in a room may precede energizing other equipment in the room.

The waveshape data may describe the shape of the electrical output of the generator 11 provided to the load 13. For the waveshape data, the external sensor 14 may be a voltage sensor or a voltage sensing circuit or a current or current sensing circuit. The waveshape data may describe how the shape of the electrical output of the generator 11 provided to the load 13 deviates from a perfect sinusoidal. The waveshape data may describe harmonic distortion. The waveshape data may include a time varying vale for a ratio of the sum of the powers of harmonic components that are not the fundamental frequency of the output of the generator 11 to the power of the fundamental frequency of the generator 11.

The power factor data may describe a power factor of the electrical output of the generator 11 provided to the load 13. The power factor data may be a time varying value for the ratio of the real power flowing to the load 13 to the apparent power flowing to the load 13. For the power factor data, the external sensor 14 may be a voltage sensor or a voltage sensing circuit, a current or current sensing circuit, or a sensor measuring both voltage and current. The power factor data may also be determined from voltage and/or current measurement made by the generator controller 10.

As an alternative to data collected by the external sensor 14, external data may be collected from an external source. The external data may include weather data retrieved from an external server or weather service. For example, the weather data may include current weather conditions or future weather conditions such as temperature, wind chill temperature, precipitation amount, precipitation type (e.g., rain, hail, snow), wind conditions (e.g., magnitude and direction), severe weather conditions (e.g. hurricane, tornado, ice storm), or other conditions.

The external data may include event data. For example, the event data may indicate specific events in time. An event may be a holiday. An event may be a sporting event or concert. The external data may include time data. For example, the time data may describe a time of day, a day of week, a month, a season, or another measure of time.

As shown by act S1, the generator controller 10 is configured to monitor the output data from the generator sensor 15 and, as shown by act S2, the generator controller 10 is configured to monitor the external sensor data from the external sensor 14 or the external source. From the output data, as shown by act S3, the generator controller 10 detects when the generator or the generator system has incurred a load event. The load event may be defined according to a variety of techniques including a power threshold, an electrical parameter threshold, a proportion of capacity, and a performance enhancement indicator.

The power threshold may be a predetermined value for the amount of power drawn by the load 13. The power threshold may be a power level for the load 13 that indicates a subsequent higher load will be demanded by the load 13. Turning on a lower power device may cause the power drawn by the load 13 to exceed the predetermined value and predict that a higher power device may be started soon after. For example, a light in a room may be a lower power device that, when turned on, predicts that an induction oven, or another high power device, will be turned on after a period of time. Other example high power devices may include dryers, motors, conveyers, welding machines, air-conditioning compressors, chillers, or other industrial devices.

The electrical parameter threshold may be a predetermined value for another electrical parameter of the power provided from the generator 11 to the load 13. The electrical parameter threshold may specify a voltage level, a current level, or a frequency value.

The proportion of capacity may be a predetermined value for a proportion of the rated value of the generator 11 that is provided by the generator 11 to the load 13. For example, when the proportion of capacity is 90%, for a 5 kW generator the threshold is 4.5 kW and for a 100 kW generator the threshold is 90 kW.

The performance enhancement indicator may be a data value that indicates whether or not a performance enhancing device for the generator 11, or associated engine, has been activated or is running. Example performance enhancing devices include turbochargers and superchargers. The performance enhancement indicator may indicate whether or not a turbocharger or supercharger is spooling. The performance enhancement indicator may indicate a speed of the turbine of a turbocharger or supercharger.

The generator controller 10 may detect a load event for the generator from the output data from the generator sensor 15 by comparing the output data to one or more of the thresholds (e.g., the power threshold, the electrical parameter threshold, the proportion of capacity, or the performance enhancement indicator). When the threshold or value is exceeded by current data, the generator controller 10 determines that a load event has occurred.

As shown by act S4, in response to the load event, the generator controller 10 may identify a subset of the external sensor data that preceded the load event from the output data the external sensor 14. The subset of the external sensor data may be defined by a predetermined time period that may range from a few seconds to many minutes. Examples for the time period may include 10 seconds, 1 minute, and 30 minutes. The predetermined time period may be selected based on the types of devices included in load 13. The predetermined time period may be selected based on the model of the generator 11 or the startup time for the generator 11. Rather than a set time period, the time period may be adjusted over time.

As shown by act S6, the generator controller 10 may be configured to perform an analysis of the subset of the external sensor data. As shown by act S8, the generator controller 10 may, from the analysis, identify patterns, trends, or shapes in the data that indicate one or more potential load event characteristics that could have caused the load event. The generator controller 10 may determine a load event characteristic from the analysis, the load event characteristic indicative of a subsequent load event for the generator.

As shown in act S9, after the load event characteristic has been stored, the generator controller 10 may again monitor other external sensor data (e.g., subsequent external sensor data) to identify when the load event characteristic occurs again. As shown in act S10, the generator controller 10 detects the load event characteristic in the other external sensor data. Based on the load event characteristic, the generator controller 10 may predict when another load event is likely to occur. To ensure that the generator system is capable of properly handling the predicted load event, the generator controller 10 may generate a generator command, as shown by act S12. The generator command may instruct one or more generators to start or close to the power bus 12. The generator command may include one or more power enhancement devices to turn on. To ensure that the generator system is capable of properly handling the predicted load event, the generator controller 10 may generate a load command. The load command may shed, or otherwise remove from the power bus 12, one or more components of load 13.

Figure 3:
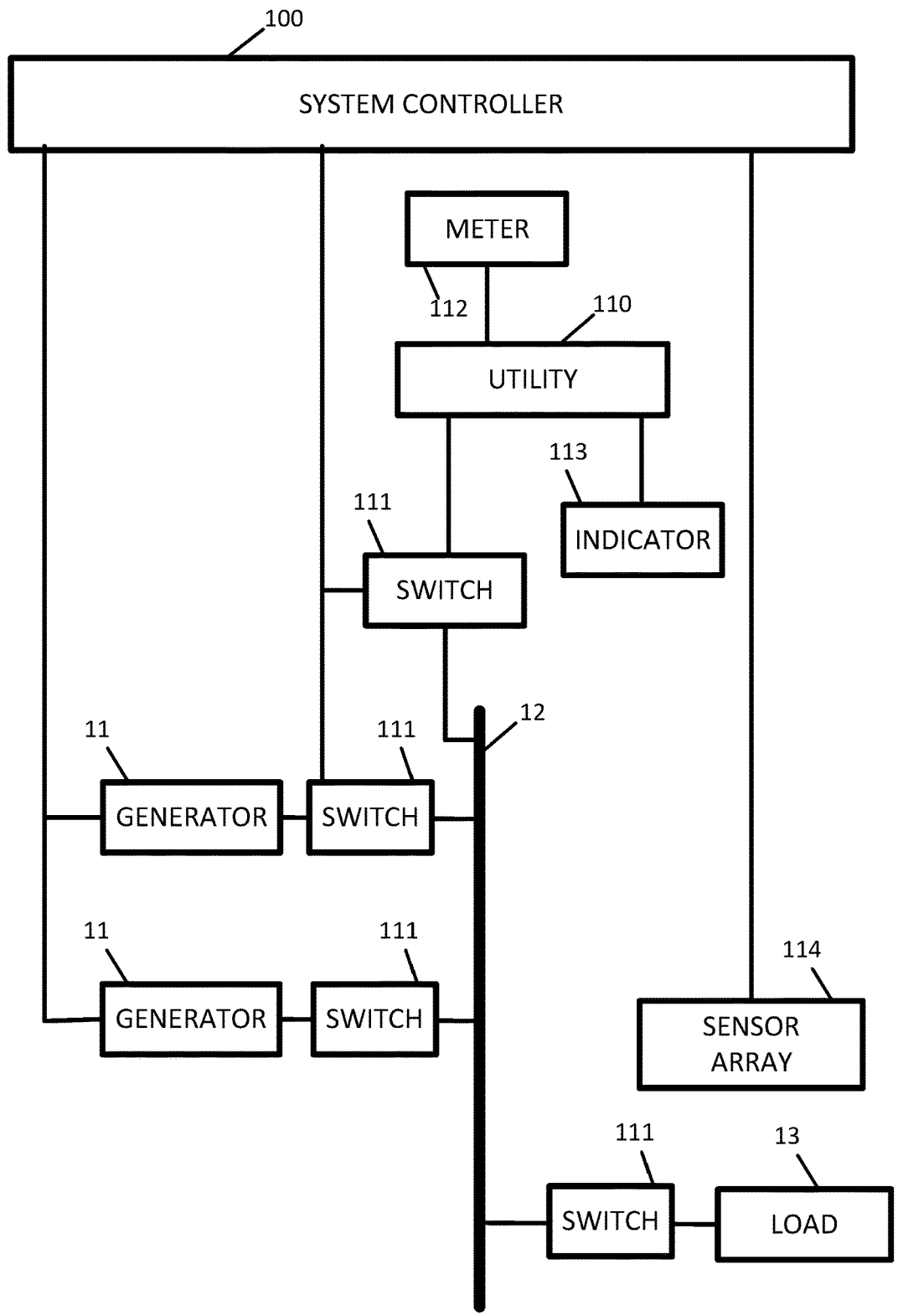
FIG. 3 illustrates an example generator system and system controller.

FIG. 3 illustrates an example generator system and a system controller 100. The system controller 100 is electrically coupled to multiple generators 11, a sensor array 114 and the generator sensor 15. The system controller 100 is electrically coupled to multiple switches 111. The system controller 100 may couple or decouple the multiple generators 11 from the power bus 12 using the switches 111. The system controller 100 may couple or decouple the utility 110 from the power bus 12 using another switch 111. Additional, different, or fewer components may be included.

The system controller 100 is configured to monitor output data associated with one or more generators. The system controller 100 may monitor the output of multiple generators 11. A generator controller associated with each of the generators may be in communication with the system controller 100 and relay the output data collected internally by the generators to the system controller 100.

The system controller 100 is configured to monitor data collected by the sensor array 114, which collect any of the types of data discussed herein. The sensor array 114 may detect one or more ambient characteristics of the load 13. The ambient characteristics may include temperature, humidity, natural light, synthetic light or other conditions in the environment of the load 13. The monitored data may be collected by multiple sensors of the sensor array 114, each associated with a different component of the load 14. For example, one sensor may collect data for the environment for an oven (e.g., first load device) and another sensor may collect data for the environment for a motor (e.g., second load device).

The system controller 100 may also monitor sensor data from and/or a meter 112 and an indicator 113. The meter 112 may provide data describing the power provided to the power bus 12 from the utility 110. The indicator 113 may provide data for other time of use indications such as the power factor or the price of the power provided by the utility 110.

The system controller 100 is configured to detect a load event for the generator from the output data. The system controller 100 may filter and organize the data from the sensor array 114 so that data from the first load device is analyzed independently from data from the second load device. Thus, the system controller 100 may detect a load event from the output data for the first load device and/or a load event from the output data for the second load device.

The system controller 100 is configured to identify a subset of the external sensor data that preceded the load event from the output data and perform an analysis of the subset of the external sensor data.

The system controller 100 is configured to determine a load event characteristic from the analysis. Subsequent load event for the generator may be detected by comparing the load event characteristic to subsequently collected data. The system controller 100 is configured to send a command to one or more of the switches 111 based on the subsequent load event. The system controller 100 may instruct the switch 111 to close an additional generator to the power bus 12. The system controller 100 may instruct the switch to remove a load from the power bus 12. The system controller 100 may balance the supply of power from the utility 110 and the generators in response to the load event. The balance (e.g., ratio of powered supplied by the generators versus the utility) may also be determined according to the data associated with the 112 and the indicator 113 such as the price of utility power and the power factor.

Figure 4A:
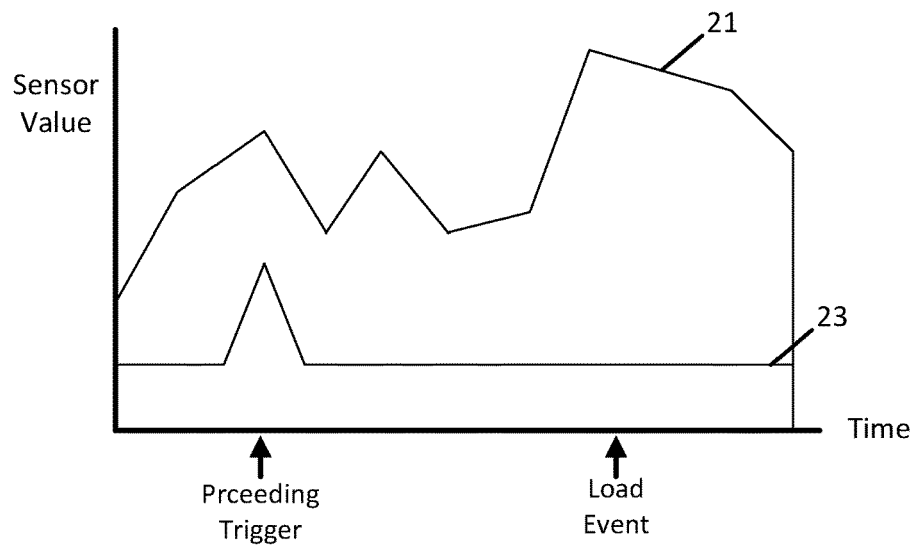
FIG. 4A illustrates an example graph for sensor data for a load event.

FIG. 4A illustrates an example graph for sensor data for a load event. The generator controller 10 or system controller 100 (hereinafter referred to individually or in combination as "controller") may executed a specialized algorithm for identifying the load event, a specialized algorithm for determining the relationship between the load event and the external data, a specialized algorithm for calculating a time window for analyzing the external data with respect to the load event, and a specialized algorithm for performing a statistical analysis on the external data with respect to the external data and the load event.

FIG. 4A illustrates includes an output data line 21 and an external data line 23. While shown on the same graph, the output data line 21 and the external data line 23 may be drawn to different scales or units on the vertical axis. The horizontal axis represents time.

The controller executes the specialized algorithm to identify the load event from the output data of the generator. The controller may compare the output data line 21 to a threshold or one or more pattern templates. The one or more pattern templates may include shapes that are indicative of the load event. Pattern templates may include one or more features such as distances between local minima or maxima, slopes for the output data line 21, or other features. The controller compares the features of the pattern templates to the shape of the output data line 21 and determines when there is a match between the output data line 21 and one or more of the pattern templates, which indicates a load event. A load event may include a load increase, a load decrease, or a capacity derating (e.g. during regeneration of a diesel particulate filter) where the generator capacity changes suddenly.

The controller executes the specialized algorithm for calculating a time window for analyzing the external data with respect to the load event. The controller may calculate a bound for the time window based on causality. That is, a maximum extent of the time window may be calculated based on characteristics of the generator system. Example characteristics for the bound of the time window (e.g., farthest back in time that data can be considered to have a causal relationship to the load event) may include the type of load or the type of deployment. Certain loads may be more likely to be impacted only by recent changes to the generator system (e.g., manufacturing appliances may only be turned on during business hours or heating or air conditioning appliances may be turned on quickly in response to temperature changes). In some examples, the maximum extent of the time window may be set at 5 minutes, 15, minutes, or 30 minutes.

The controller may also or alternatively calculate a minimum extent of the time window based on characteristics of the generator system. Example characteristics for the bound of the time window (e.g., closest in time that data can be considered relevant) may include a response time of a generator. For example, if the generator in the generator system requires 10 seconds to start running, then the time window for analyzing the external data for a causal relationship to the load event may be set to be no more recent than 10 seconds. The response time may be determined from a preconfigured lookup table, configured on-site, or learned from observation of the system.

The controller may also set either bound of the time window by analyzing the speed of the quickest action in the generator system. The controller may measure the reaction time by measuring the time delay from sending a command to bring a generator online until the output of the generator system reflects the added generator. The controller may measure the reaction time by measuring the time delay from a sending a command to add or remove a load from the generator system. The reaction time may be preconfigured. The controller may define one or both of the bounds of the time window based on the reaction time of the generator system. The reaction time of the generator system may be significantly faster than the time required to start a generator.

The controller executes the specialized algorithm for performing a statistical analysis on the external data with respect to the external data and the load event. The controller may keep statistics on the load events as they are detected and modified over time. In one example, the load 13 on the generator system includes two loads in a room, including a light and an induction oven. When the induction oven is switched on, the controller identifies a load event and identifies that the load event is preceded by turning on the light by various times. The controller analyzes multiple instances of occurrences of the load event and calculates a time difference between when the light is turned on and when the load event occurs. The controller may calculate an average time difference between the load event and the light as well as a standard deviation of the mean time. The controller calculates a range based on the standard deviation, the minimum and maximum measured, or some other technique. Any generator system commands (e.g., starting generators, closing generators to the bus, adding or removing loads) may be issued at the beginning of the resultant range from the statistical analysis, which is earlier than the average time.

Figure 4B:
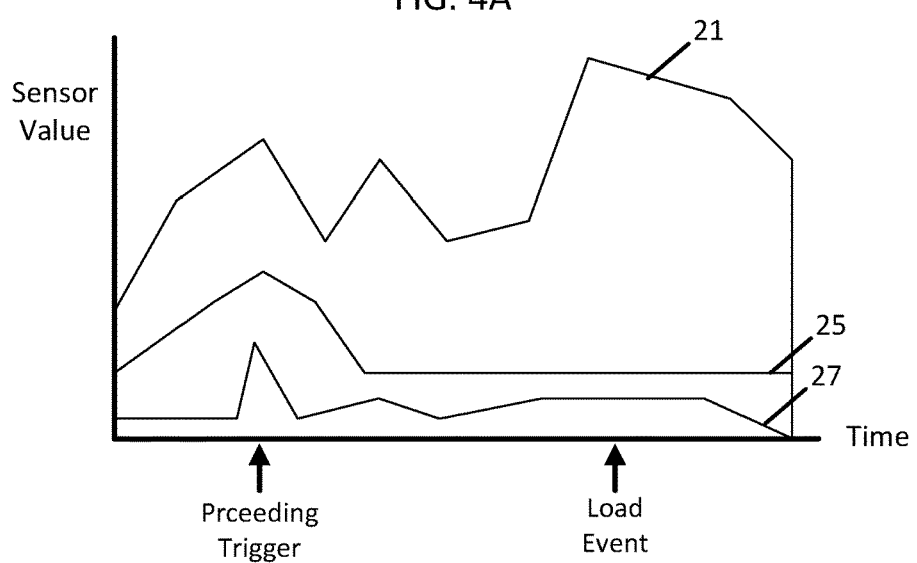
FIG. 4B illustrates another example graph for sensor data for a load event.

FIG. 4B illustrates another example graph for multiple types of sensor data illustrated by data line 25 and data line 27 for a load event in output data line 21. While shown on the same graph, the output data lines 25 and 27 and the external data line 23 may be drawn to different scales or units on the vertical axis. The horizontal axis represents time.

The controller executes the specialized algorithm to identify the load event from the output data of the generator. The controller may compare a combination of output data lines 25 and 27 to a threshold or one or more pattern templates. The one or more pattern templates may include shapes that are indicative of the load event. Pattern templates may include one or more features describing shapes of the lines (e.g., slopes, maxima, minima, or other features). Line fitting techniques such as least squares may be used to match the output data lines 25 and 27 to the predetermined patterns.

The controller may compare the sum of the output data lines 25 and 27 to a threshold to identify the load event. In other examples, the sensors for output data lines 25 and 27 may be unequally weighted. The weights may be fractional or decimal values. For example, a first weight is applied to data from a first sensor and a second weight is applied to data from a second sensor. For example, when data from the first sensor is $X1$, the first weight is $W1$, the second sensor is $X2$, the second weight is $W2$, and the threshold is $Y$, the controller compares $Y$ to the sum of $X1*W1$ and $X2*W2$.

In addition or in the alternative to combining sensor values, the specialized algorithm to identify the load event that is executed by the controller may consider that multiple events may have occurred close together in time and overlap in the sensor data. The controller may separate the pattern of one load event by subtracting the pattern from the sensor data. The result of the subtraction may be compared to identify the other load event in the sensor data. In some examples, loads may also cancel each other out in time so that the transition of either load is not visible in the sensor data. In some applications, a vent fan may turn on close in time to when a purge fan turns off.

Figure 4C:
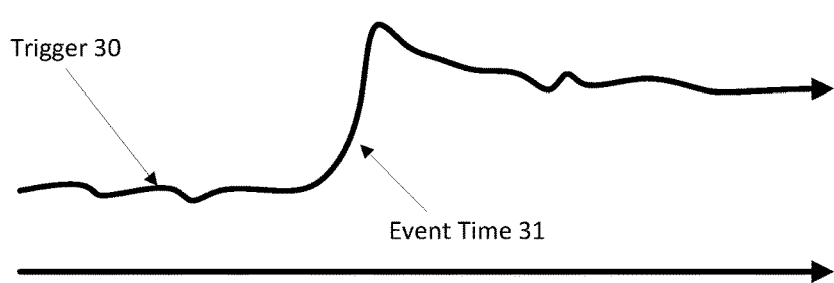
FIG. 4C Illustrates an example graph for load on the generator system.

FIG. 4C Illustrates an example graph for load on the generator system. The trigger event occurs at time 30, but it is not differentiable from the normal fluctuation on the signal. If the system is unable to detect this trigger event, the system may be unable to predict the load event 31, therefore the load may be considered unpredictable or substantially unpredictable.

The system may track loads to determine predictable and non-predictable load, in addition to determining eligible and non-eligible load. Predictable but ineligible loads are still more helpful than unpredictable loads because the system can determine if the loads are active or inactive, meaning that additional generator capacity is not required to support them when they are active. In order to provide this functionality, a load event trigger must be detectable in both the increasing and decreasing direction.

Figure 5A:
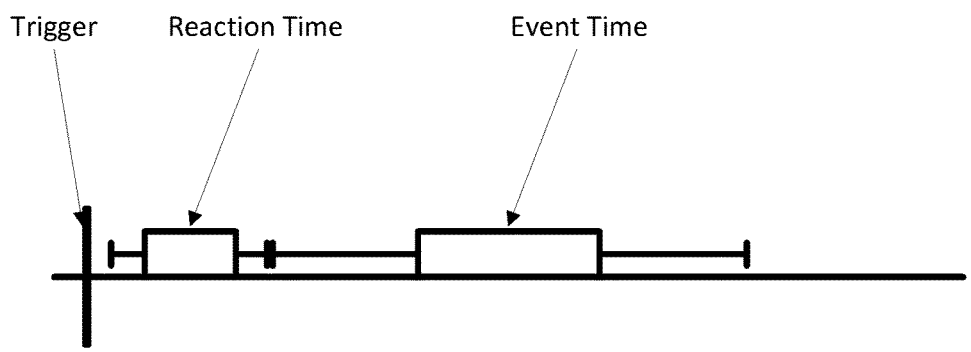
FIG. 5A Illustrates an example bar and whisker plot of a useful trigger event.

FIG. 5A Illustrates an example bar and whisker plot 50 of a useful trigger event (or significant trigger event). The trigger event occurs enough before the expected load event to allow the system time to react. This trigger event may be any of the factors referenced herein. The system may react to the trigger immediately, or wait until the maximum expected reaction time would still provide necessary power before the earliest expected occurrence of the load event. This load may be considered as a predictable and eligible load, allowing the generation capacity required to supply it to be offline unless needed.

Figure 5B:
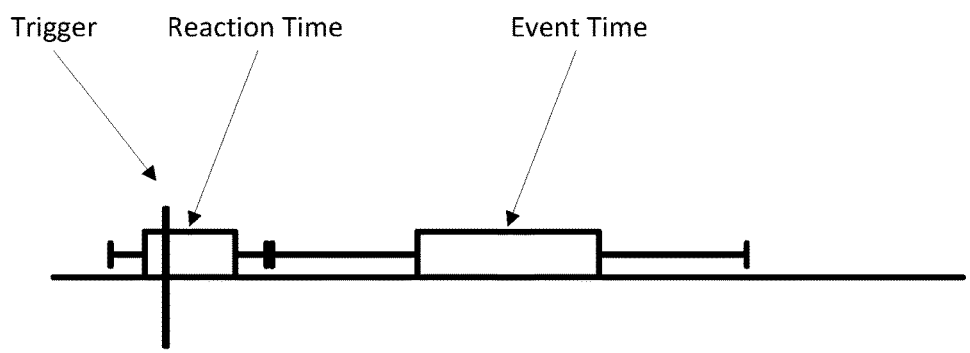
FIG. 5B Illustrates an example bar and whisker plot of a non-useful trigger event.

FIG. 5B Illustrates an example bar and whisker plot 51 of a non-useful trigger event (or non-significant trigger event). This event occurs before the event, but not enough before the event to provide sufficient certainty of providing the necessary available power capacity increase. The trigger is detected, so the load event is predictable, but it is not eligible to allow additional capacity to be taken offline because there may not be sufficient time to bring additional capacity online.

Although FIGS. 5A and 5B illustrate example bar and whisker plots using standard deviations of event and response times, other techniques for determining the maximum, minimum and expected response time are contemplated. Techniques for determining the minimum, maximum and expected response time may include Tracking the actual maximum, minimum and average, computing the minimum, maximum and average after rejecting certain outliers (e.g. when a generator had a failure), allowing the user to set the minimum, maximum and average, or other techniques which establish these three thresholds.

Figure 6:
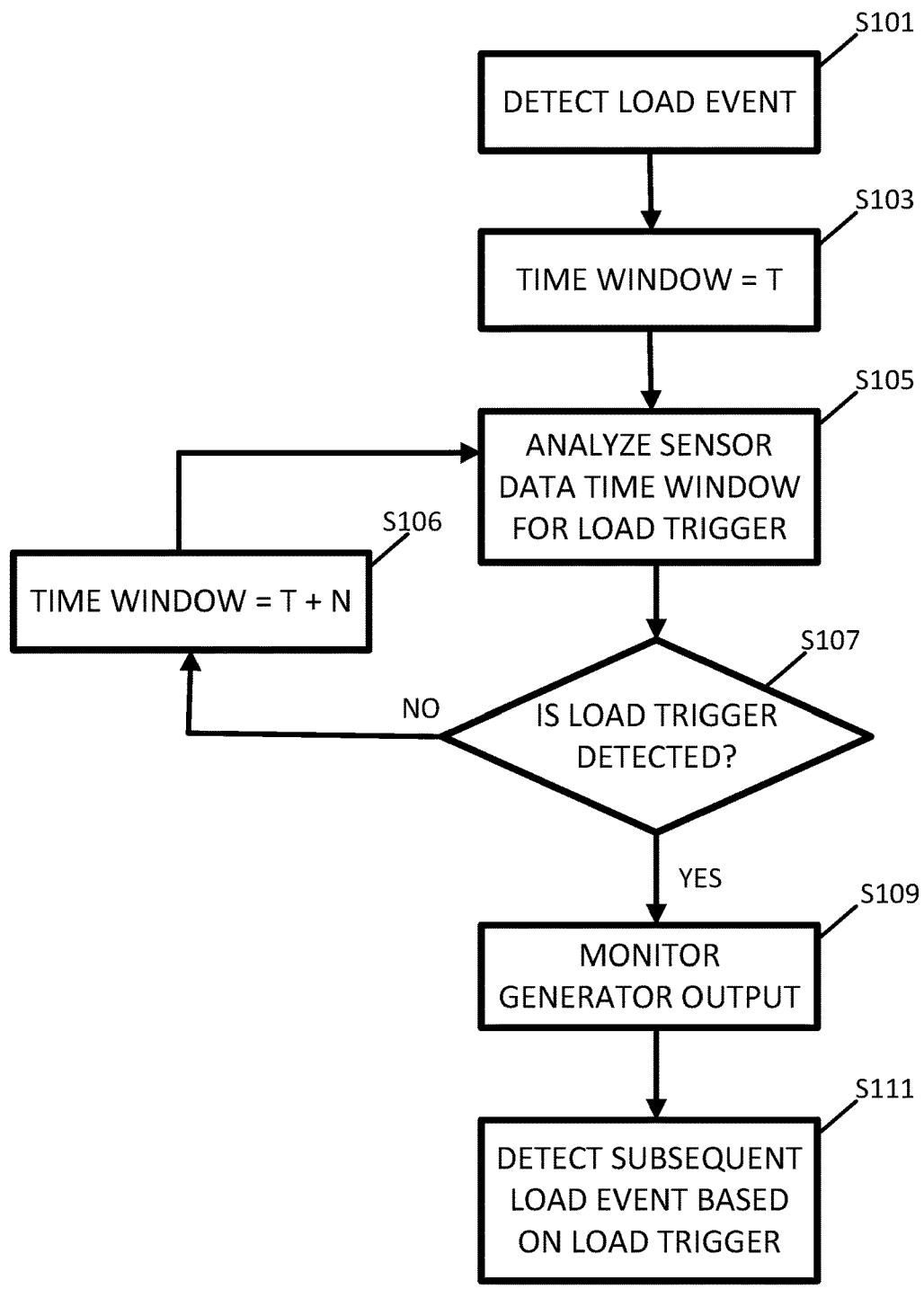
FIG. 6 illustrates a flow chart for prediction of generator events using a varying time window.

The minimum, maximum and average time between a trigger and an event may also be determined based on user adjustable parameters. As an example, the minimum, maximum and average may be computed based on a desired certainty number. As another example, the minimum, maximum and average may be computed over an adjustable time window, with older data being excluded from the calculation FIG. 6 illustrates a flow chart for prediction of generator events using a varying time window. Additional, different or fewer acts may be included.

After a load event is detect, as shown by S101, as described in embodiments herein, the controller may access a time window (T) from memory, as shown by S103. The time window may be initially defined as a default amount of time and then modified over time. The default time window may be selected automatically or by user input. The default time window may be adjusted according to the average time between trigger events and load events.

The following sequence of acts describes an algorithm for the controller to increase the time window over time as needed. At act S105, the controller analyzes the sensor data for a load trigger. At act S107, if the load trigger is identified, the controller proceeds to monitor generator output at act S109, as described by any of the embodiments herein, and detects a subsequent load event based on the load trigger, as shown by act S111.

However, if at act S105, if the load trigger is not identified, the controller increases the time window by a time increment N, such that the time window is set to the default time window plus the time increment, as illustrated by act S106 (e.g., time window=T+N). With an increased span on the time window, more data is analyzed as the controller repeats act S105. The controller again determines if a load trigger is detected in act S107. If not, the time window may again be increased. The loop for increasing the time window may be increased any number of times or a predetermined maximum number of times. Examples for the maximum number of times may be 3, 10 or 20 iterations.

Figure 7:
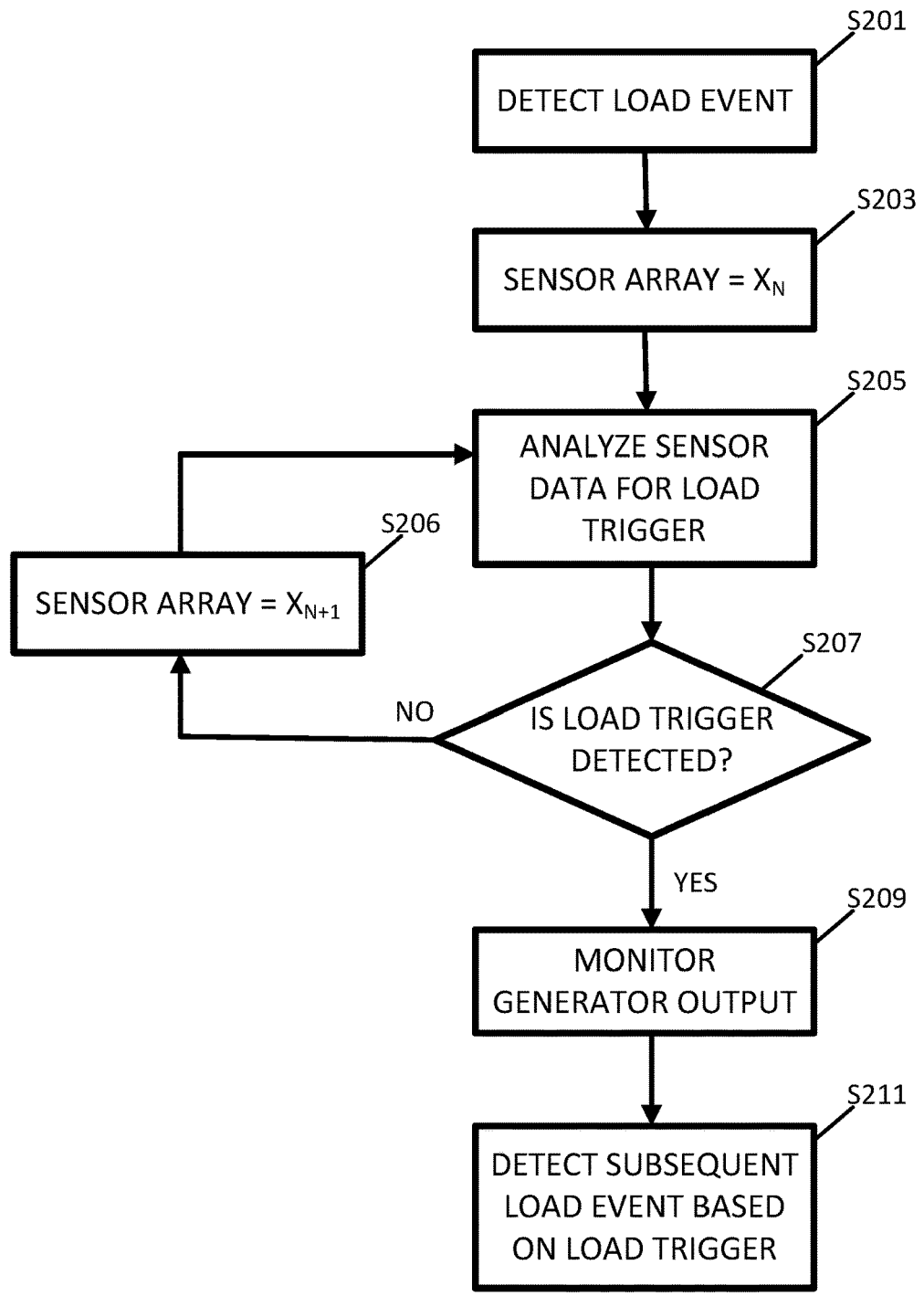
FIG. 7 illustrates a flow chart for prediction of generator events using a sensor array.
Figure 8:
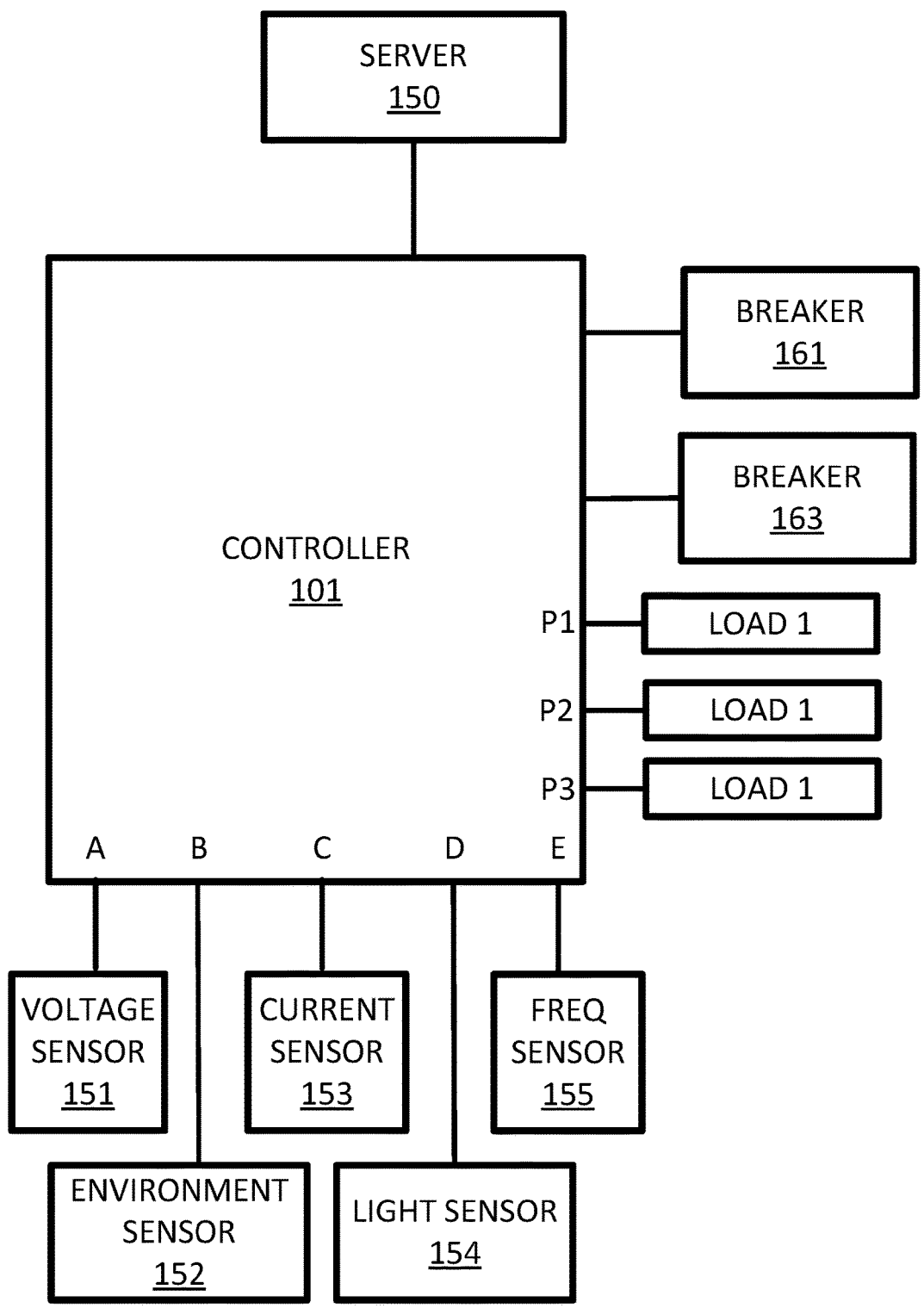
FIG. 8 illustrates an example generator system controller and sensor array.

FIG. 7 illustrates a flow chart for prediction of generator events using a varying sensor array. Additional, different or fewer acts may be included. FIG. 8 illustrates an example controller 101 (e.g., generator controller or system controller) connected to multiple sensors including voltage sensor 151, current sensor 153, frequency sensor 155, environment sensor 152, and light sensor 154 and connected to breaker 161 (e.g., generator breaker) and breaker 163 (e.g., load breaker) and in communication with server 150.

After a load event is detected, as shown by S201, as described in embodiments herein, the controller may access a defined sensor array $X_n$, as shown by act S203. The sensor array may include a single sensor or a combination of sensors.

The following sequence of acts describes an algorithm for the controller to change the sensor array over time as needed. At act S205, the controller analyzes the sensor data for a load trigger using the currently selected sensor array. At act S207, if the load trigger is identified, the controller proceeds to monitor generator output at act S209, as described by any of the embodiments herein, and detects a subsequent load event based on the load trigger, as shown by act S211.

However, if at act S205, if the load trigger is not identified, the controller modified the sensor array from sensor array $X_n$ to $X_{n+1}$, at act S206. The values N, N+1, N+2, and so on may represent locations in a vector or matrix. In one example, the sensor array is a single sensor is selected from available sensors. For example, if the available sensors are $[X_1, X_2, X_3, X_4, X_5]$, the controller may sequence through each available sensor until a sensor is found that provided data for a load trigger. Sensor $X_1$ may be a temperature sensor, sensor $X_2$ may detect the humidity, sensor $X_3$ may detect a voltage at the load, sensor $X_4$ may detect a current at the load, and sensor $X_5$ may detect a frequency at the load. In another example, the sensor array may include combinations of sensors. For example, if the available sensors are $[X_1=(X_A, X_B, X_C), X_2=(X_A, X_D, X_E), X_3=(X_A, X_E)]$. Sensor $X_A$ may be a temperature sensor, sensor $X_B$ may detect the humidity, sensor $X_C$ may detect a voltage at the load, sensor $X_D$ may detect a current at the load, and sensor $X_E$ may detect a frequency at the load. Other examples are possible in which the controller cycles through single sensors and combinations of sensors in the sensor array.

Until a load event is identified, more or different data is analyzed as the controller repeats act S205. The controller again determines if a load trigger is detected in act S207. If not, the controller may again iterate through the sensor array. The loop for changing the sensor array may be increased any number of times or a predetermined maximum number of times. Examples for the maximum number of times may be 1, 2 or 5 iterations.

In some examples, the controller 101 may not identify the source of the sensor data. For example, rather the temperature sensor or voltage sensor, the controller may simply receive sensor data at available ports or connections that are not designated with a particular source. Thus, the controller 101 may be agnostic to the types of sensors that source the data for the analysis of the load trigger. For example, at each of connections A-E in FIG. 8, any type of sensor may be connected. The controller 101 analyzes the sensor data in the same manner regardless of the source. A user may simply connect sensor as available and in any convenient order and leave the analysis up to the learning algorithm executed by the controller 101.

In one example, the controller 101 may include load connections priority 1 (P1), priority 2 (P2), and priority 3 (P3). When the user connects a sensor connection to P3 only (or any individual load connection), the controller 101 analyzes the electrical parameters of P3 in identifying the potential triggers. When multiple load connections are used, the controller 101 analyzes the electrical parameters from the multiple load connections in identifying potential triggers.

The controller 101 may execute a learning algorithm to determine relationships between the electrical parameters of the of the individual load connections, the sensor data, or other data. Other data that is inputted to the learning algorithm may include a time quantity for the generator to begin running, a time quantity for synchronizing the generator, a time quantity for coupling a load, and/or or a sequence for the order that the loads are connected.

Example learning algorithms may include a vector classifier, k-mean clustering, random forest, decision tree, k-nearest neighbors, or another algorithm. The learning algorithm identifies relationships among the sensor data over time in order to identify when subsequent sensor data may predict a load event.

In addition to a prediction on when a load event is predicted to occur, the controller 101 may also calculate a certainty value. The certainty value may be based on how similar the current conditions in the sensor data are to the training data when the load event occurred. The controller 101 may compare the certainty value to a threshold certainty. The controller 101 may implement the generator command only when the load event is predicted and the certainty value exceeds the threshold certainty. In other examples, different generator commands may be issued when a load event is predicted depending on the certainty value. For example, when a load event is predicted, the controller 101 may close an additional generator to the bus when the certainty value exceeds the threshold certainty. However, when the load event is predicts and the certainty value does not exceed the threshold certainty, the controller 101 may only run the pre-lubrication sequence on the generator so that the generator is on standby but has not been coupled to the bus.

Thus, the controller 101 may generate a first generator command when a load event is predicted and the certainty value is less than the threshold certainty and generator a second generator command when the load event is predicted and the certainty value is greater than the threshold certainty.

The server 150 may provide data to the controller 101 from other sources. The other sources may include weather data, event data, electricity pricing data, user preferences, occupancy data, scheduled utility service outages, utility load shed requests, HVAC system data, breaker positions, process schedules or other information that could potentially be used to predict load events. In some examples, the controller 101 sends a request to the server 150 that specifies the type of data and the server 150 provided the data in response. In some examples, the data supplied by the server 150 is used in the learning algorithm for predicting the load event. For example, weather data with temperatures above a threshold may indicate that an air conditioner is likely to be connected to the generator system. In some examples, the data supplied by the server 150 is used to determine the generator command. For example, when electricity pricing is above a threshold, a load may be disconnected rather than relying upon the utility to supply the load.

The server 150 may also provide updates or modifications to the algorithms executed by the controller 101. For example, the learning algorithm may be performed in other generator systems and the data is aggregate for developing the algorithm for predicting the load event. Software updates for any of the algorithms may be provided through the server 150.

The server 150 may also relay commands from remote users. For example, the controller 101, including the user-specified parameters (e.g., learning algorithm, thresholds, possible generator commands) may be set by a user at another computer (e.g., control panel, mobile device, or workstation) that communicates with the controller 101 through the server 150.

Figure 9:
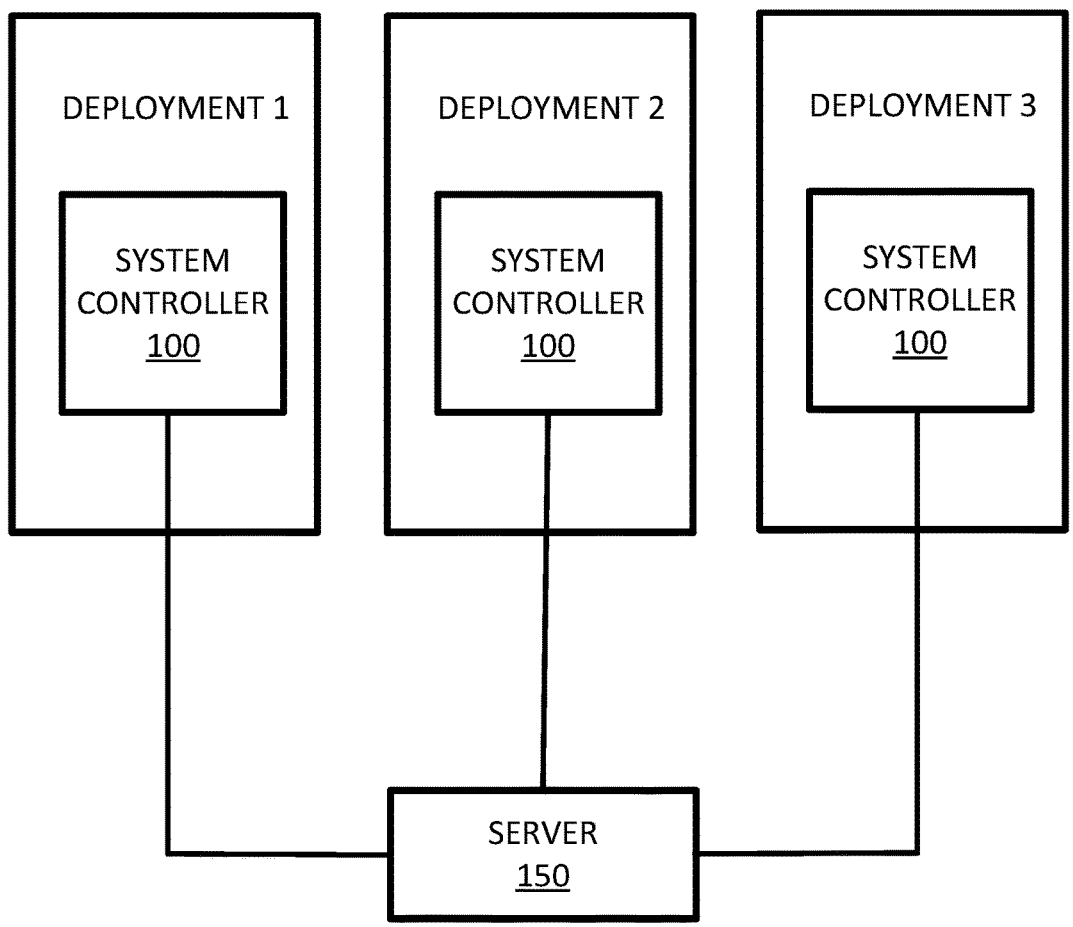
FIG. 9 illustrates an example network server and multiple generator systems.

FIG. 9 illustrates an example network server 150 and multiple generator systems. Different deployments may have different generator system layouts, load types, and other parameters. One deployment may be a home, another deployment an industrial facility, and another deployment a hospital. Each deployment includes at least a system controller 100. The server 150 facilitates coordination of the learning process between the various deployments. In one example, the server 150 trades messages between the system controllers 100 so that more data is available to the learning algorithms. In another example, the server 150 collects data for the learning algorithm and defines the learning algorithm at the server 150 before pushing the algorithms to the system controllers 100 for execution.

Figure 10:
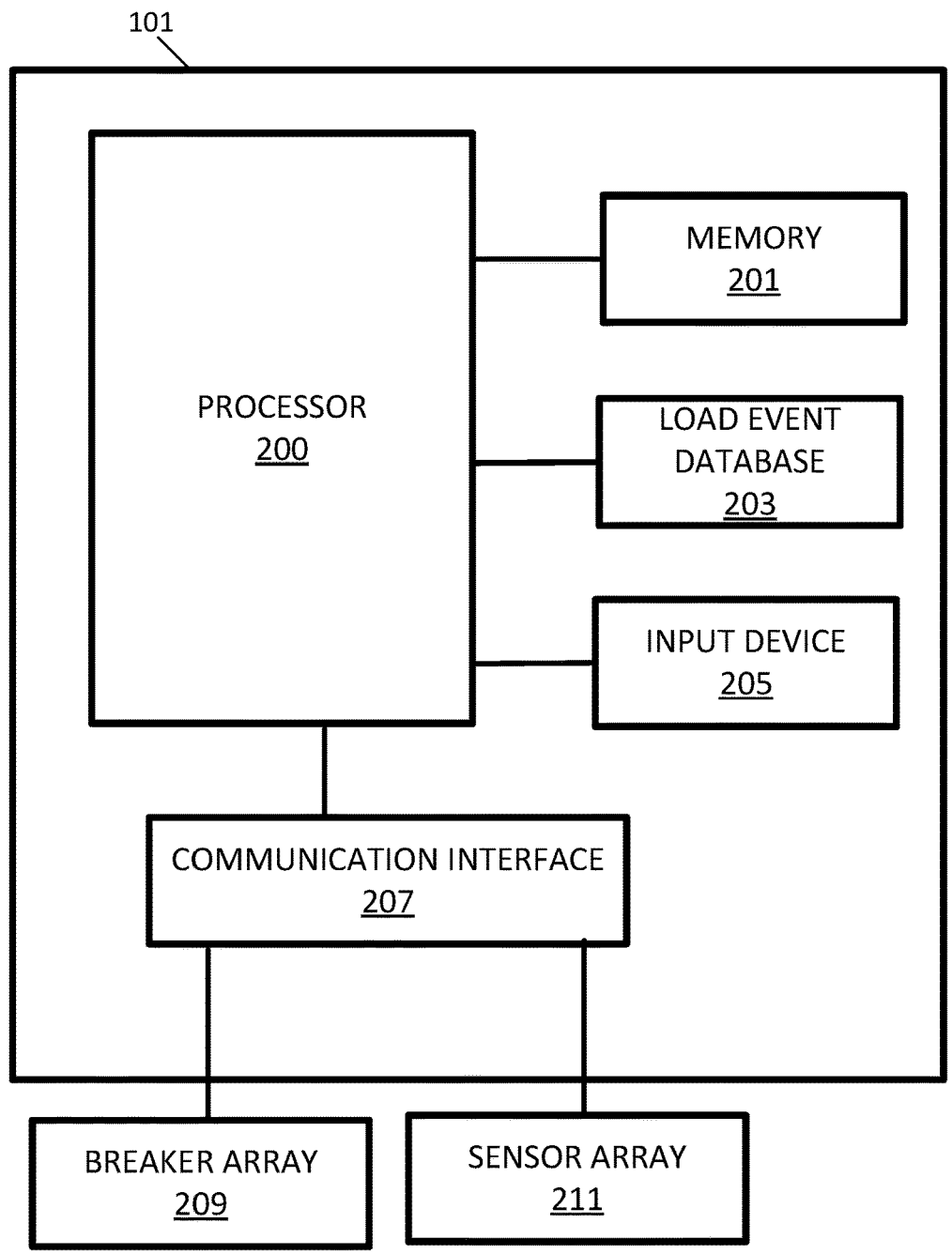
FIG. 10 illustrates an example generator system controller.

FIG. 10 illustrates an example controller 101 including a processor 200, a memory 201, a load event database 203, an input device 205, and a communication interface 207. The communication interface 207 may send commands to a breaker array 209 and/or a sensor array 211. Additional, different, or fewer components may be included.

The communication interface 207 is configured to receive output data associated with an electrical output of a generator and receive external sensor data associated with the generator. The output data and sensor data may be stored in memory 201 for analysis. The output data may describe the total load on the generator system in power, voltage, or current.

The external data may be received from sensor array 211. The external data may include any combination of different data types including local data for the operation of the generator system, remote data from a server, and environment data for the environment of the generator system. The local data may describe which loads are connected to the generator system and one or more electrical parameters of the loads. The remote data may include weather, pricing, or other data that is reported from an external source. The environment data may include data collected in the vicinity of the generator system.

The processor 200 is configured to detect a load event for the generator from the output data. The load event may be defined when the aggregate load exceeds a predetermined value. The processor identifies a subset of the external sensor data that preceded the load event from the output data. The characteristics of the external data that preceded the load event may be stored in load event database 203. The data may be defined in a pattern or signature. A particular attribute of the data may be stored as a load trigger.

An analysis of the subset of the external sensor data determines a load event characteristic from the analysis. The load event characteristic corresponds to a subsequent load event for the generator. The processor 200 performs a comparison the external sensor data occurring after the first load event to the load event characteristic and identifies a subsequent load event or a second load event based on the comparison.

In response to the subsequent load event, the processor 200 may generate a generator command. In one example, the generator command includes instructions for breaker array 209 to connect or disconnect one or more generators from the generator system or power bus and/or connect or disconnect one or more loads from the generator system or power bus.

The input device 205 may receive commands from a user to start or end the learning process for analyzing the external data. The input device 205 may receive a manual indication of a load event, which initiates a snapshot of the preceding external data for analysis. The input device 205 may receive inputs for defining the thresholds for applying the load trigger. The input device 205 may receive inputs for defining the generator commands resulting from subsequent load events.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 207 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
    monitoring output data associated with a load supplied by an output of a generator;
    detecting a load event from the output data associated with the load;
    monitoring external sensor data associated with the generator;
    identifying, in response to the load event, a subset of the external sensor data within a time window and that preceded the load event from the output data, wherein the time window is calculated based on a causal relationship between the load event and the external sensor data;
    performing an analysis of the subset of the external sensor data;
    determining a load event characteristic from the analysis of the subset of the external sensor data;
    monitoring subsequent external sensor data for the load event characteristic indicative of a subsequent load event for the generator; and
    providing a signal when the subsequent load event is predicted based on the subsequent external sensor data.

2. The method of claim 1, wherein the external sensor data includes an environmental condition of the load.

3. The method of claim 1, wherein the external sensor data includes at least one electrical parameter.

4. The method of claim 1, wherein the external sensor data includes scheduling information.

5. The method of claim 1, wherein the external sensor data includes occupancy information.

6. The method of claim 1, wherein determining the load event characteristic is performed according to a learning algorithm based on the output data associated with a load supplied by the output of the generator.

7. The method of claim 1, wherein the output data includes electrical quantities associated with the output of the generator.

8. The method of claim 7, wherein the electrical quantities associated with the output of the generator include a voltage, a frequency, or a current of a power signal of the output of the generator.

9. The method of claim 7, further comprising:
    measuring a response characteristic of the generator; and
    defining a time period based on the response characteristic of the generator.

10. The method of claim 1, wherein providing the signal when the subsequent load event is detected includes generating an instruction to start an additional generator and connect the additional generator to the load.

11. The method of claim 1, wherein providing the signal when the subsequent load event is detected includes generating an instruction to add or remove one or more loads from a bus.

12. The method of claim 1, wherein the load event characteristic includes a pattern and shape indicative of the load event and the subsequent load event.

13. An apparatus comprising:
a communication interface configured to receive output data associated with a load of a generator and receive external sensor data associated with the generator; and
a controller configured to detect a load event for the generator from the output data and identify, in response to the load event, a subset of the external sensor data within a time window and that preceded the load event from the output data, wherein the time window is calculated based on a causal relationship between the load event and the external sensor data;
wherein an analysis of the subset of the external sensor data determines a load event characteristic,
wherein subsequent external sensor data is monitored for the load event characteristic to detect a subsequent load event for the generator.

14. The apparatus of claim 13, wherein the output data associated with the load includes real power provided to the load.

15. The apparatus of claim 13, wherein the sensor data associated with the load includes an environmental condition associated with the load.

16. The apparatus of claim 13, wherein the sensor data associated with the load includes a scheduling condition associated with the load.

17. A generator system comprising:
a power bus;
a first generator coupled to the power bus;
a generator sensor configured to collect data indicative of an output of the first generator;
a sensor configured to collect data associated with the generator system;
wherein a load event detected from the data indicative of the output of the first generator is associated with a time window from the data associated with the generator system, wherein the time window is calculated based on a causal relationship between the load event and the data associated with the generator system; and
a controller configured to analyze the time window to identify a load trigger for the load event,
wherein a subsequent occurrence of the load trigger is detected from subsequent data associated with the generator system.

18. The generator system of claim 17, wherein the controller is configured to connect a second generator to the power bus in response to the load trigger detected from the subsequent data associated with the generator system.

19. The generator system of claim 17, wherein the controller is configured to calculate a certainty value for the load trigger and provide a generator command based on the load trigger and the certainty value.

* * * * *